United States Patent Office 3,264,266
Patented August 2, 1966

3,264,266
POLYMER PREPARED BY REACTING AN ACETAL, PROPYLENE OXIDE AND STYRENE WITH BORON TRIFLUORIDE DIETHYL ETHERATE CATALYST
Rüdolf Merten, Cologne-Mulheim, and Küno Wagner, Leverkusen, Germany, assignors to Farbenfabriken Bayer Aktiengesellschaft, Leverkusen, Germany, a corporation of Germany
No Drawing. Filed Mar. 27, 1959, Ser. No. 802,311
Claims priority, application Germany, Apr. 3, 1958, F 25,413
1 Claim. (Cl. 260—73)

This invention relates generally to the preparation of a novel polymer and, more particularly, to a high molecular weight polymer and to a method for making the polymer.

It has been proposed heretofore to prepare polymers from alkylene oxides and olefins. It has also been proposed to produce polymers from alkylene oxides and olefins in the presence of Friedel-Crafts catalysts or a catalyst known to be useful in ionically excited polymerization processes. Polyacetals have been reacted heretofore in the presence of acid catalysts with olefins to form compounds in which the acetal groups are wholly or partially replaced by a propanediol-1,3-ether group.

It is an object of this invention to provide a method for making high molecular weight polymers suitable for reaction with an organic polyisocyanate to form a polyurethane. Another object of the invention is to provide an improved method for preparing polymers from alkylene oxides, olefines, and acetals.

The foregoing objects and others are accomplished, generally speaking, in accordance with this invention by providing a process in which an organic compound containing at least one acetal group is reacted with an alkylene oxide and a compound containing one or more reactive carbon to carbon double bonds in the presence of a Friedel-Crafts catalyst or other ionic polymerization catalysts.

In the process according to the invention, it is possible to use any acetal which contains one or even more acetal groups of linear or cyclic nature.

Any suitable compound containing at least one acetal group may be used in accordance with this invention, such as, for example, an acetal prepared by reaction between a compound having a carbonyl group, including, for example, formaldehyde, acetaldehyde, benzaldehyde, and a monohydric alcohol which can be substituted in any desired manner. Any suitable monohydric alcohol, such as, for example, methanol, ethanol, beta-chloro-ethanol, propanol, isopropanol, butanols, benzyl alcohol, furfuryl alcohol, cyclohexanol, allyl alcohol, or oleyl alcohol may be used. Likewise, the reaction products of one of these alcohols or a phenol with alkylene oxide, such as, for example, ethylene oxide, propylene oxide, butylene oxides, epichlorohydrin, or styrene oxide may be used.

Compounds containing more than one acetal group may be formed by reacting an aldehyde, such as, for example, formaldehyde, acetaldehyde, or glyoxal, with a polyhydroxy compound. Any suitable polyhydric alcohol, such as, for example, the pentanediols, hexanediols, 7,18-dihydroxy-octadecane, 2-butene - 1,4-diol, 2-butyne-1,4-diol, butanetriols, trimethylol propane, glycerine, hexanetriols, sorbitol, 4,4'-dihydroxy dicyclohexyl methane, and 4,4'-dihydroxy dicyclohexyl dimethyl methane may be used. It is also possible to use reaction products of alkylene oxides, such as, ethylene oxide, propylene oxide, butylene oxide, styrene oxide, epichlorohydrin or tetrahydrofuran, with these alcohols or other alcohols usually forming cyclic monoacetals, such as, ethylene glycol, propane-1,2-diol, propane-1,3-diol, or the butanediols, or with phenols, such as, 4,4'-dihydroxyl diphenyl methane, 4,4'-dihydroxy diphenyl dimethyl methane, and hydroquinone. Also suitable are the polycondensates of alkylene oxides with terminal hydroxyl groups, the reaction products of the above polyhydroxy compounds with unsaturated compounds, such as, for example, glycerine-monoethyl methacrylate, as well as their polymers and copolymers, polyesters, such as, castor oil, phthalic acid diglycol ester, ricionleic acid glycol ester, polyesters containing OH groups, for example, those derived from glycol and adipic acid, fumaric acid, maleic acid, etc., which polyesters can also contain monofunctional components, such as, for example, oleic acid, incorporated therein by condensation; polythioethers with terminal hydroxyl groups, wholly or partially saponified polyvinyl acetates, and those reaction products of acid amides and alkylene oxides which contain hydroxy groups, such as, for example, adipic acid-bis-oxethyl methylamide. Furthermore, monohydric alcohols, such as, methanol, ethanol, allyl alcohol, oleyl alcohol, propargyl alcohol, etc., and their oxalkylation products can also be used to a subordinate degree in admixture with polyhydroxy compounds.

The alcohols, as well as the acetals, can also contain other atom groupings, both in the chain and also laterally, such as, for example, halogen atoms, ester, amide, nitro, ether, thioether, sulpho, carboxyl, urethane and epoxide groups, heterocyclic rings and unsaturated groupings.

Suitable polyacetals are also the reaction products of alcohols with alkynes, such as, acetylene, 2-butyne-1,4-diol, etc.; reacetalization products of the acetal of a low-boiling alcohol and a hydroxy compound of high boiling point, for example, of dibutyl acetaldehyde acetal and hexane-1,6-triol, as well as soluble polymers of formaldehyde and acetaldehyde. The polyacetals also include, for example, the condensation products of xylene and formaldehyde and the soluble condensation products of phenols, urea, or melamine with formaldehyde, which can, if desired, be produced in the presence of alcohols or glycols.

Examples of compounds with one or more cyclic acetal groups include the reaction products of a compound having a carbonyl group, such as, for example, formaldehypde or acetaldehyde, and a polyhydroxy compound which contains OH groups in steric conditions favorable for the formation of cyclic acetals. Examples of polyhydroxy compounds which may be mentioned are polyhydric alcohols which advantageously contain an alpha,beta- or alpha,gamma-diol configuration, such as, for example, ethylene glycol, propane-1,2-diol, propane-1,3-diol, butane-1,2-diol, butane-1,3-diol, butane-1,4-diol, 2-butene 1,4-diol, glycerine, trimethylol propane, tetramethylol cyclohexanol, pentaerythritol, sorbitol, butanetriols and hexanetriols; in addition, polyhydroxy compounds which are partially etherified or esterified, provided they still contain the corresponding diol functions, can be employed; examples are glycerine monoesters or monoethers, such as, glycerine monomethyl methacrylate and trimethylol propane monoesters, or ethers, such as, trimethylol propane monoallyl ether. Polyacetals of partially saponified polyvinyl acetate are also suitable.

The acetals mentioned can, of course, be admixed in any desired manner, and it is also possible to use polyacetals which contain both linear and cyclic acetal groups in the molecule.

The acetals used can contain up to 15% of free hydroxyl groups without any disadvantageous effect on the process of the invention being observed.

Any suitable alkylene oxide may be used, such as, for example, all compounds which contain the configuration

in which $n=2$ or 3 and R represents hydrogen atoms and/or any desired substituents. Examples include the unsubstituted alkylene oxides, such as, ethylene oxide, and trimethylene oxide, as well as their alkyl or aryl substitution products, of which a few representatives are propylene oxide, butylene oxides, styrene oxide, and trimethylene oxides substituted in the 3-position, as indicated in British patent specification No. 758,450. Furthermore, the alkylene oxides can also contain other atom groupings in the chain or also laterally, such as, for example, halogen atoms including chlorine and bromine, or hydroxy, ester, amide, nitro, ether, thioether, sulpho, carboxyl, or urethane groups, heterocyclic rings or also unsaturated hydrocarbon radicals. As examples, there are especially to be mentioned epichlorohydrin, the trimethylene oxide derivatives disclosed in British patent specification No. 758,450, and their oxide derivatives, such as, for example, 3-ethyl-3-hydromethyl trimethylene oxide and 3,3-bis-hydroxymethyl trimethylene oxide; glycidyl ethers of monohydric alcohols, such as, 1-allyl hydroxy 2,3-epoxy propane; the reaction products of mono- or poly-unsaturated higher carboxylic acids with peroxidic compounds; and, furthermore, vinyl cyclohexene oxide and the olefins still containing epoxide groups which are disclosed in United States patent specification No. 2,692,876.

The last-mentioned compounds, which simultaneously contain a reactive carbon-to-carbon double bond, as well as an epoxide group, can be used both as an alkylene oxide component and as an olefine component.

Examples of compounds with several alkylene oxide groups, which may be used include dioxaspiroheptane and its derivatives, divinyl benzene, butadiene dioxide, diglycidyl, and higher polyglycidylethers obtained by the reaction of epichlorohydrin with polyhydric alcohols or phenols, such as, for example, 4,4'-dihydroxy diphenyl dimethyl methane or butane-1,4-diol.

Any compound which contains one or more reactive carbon-to-carbon double bonds may be used as the olefines. Ethylene, propylene, the butylenes, including isobutylene, styrene, and also butadiene, isoprene, divinyl benzene, cyclopentadiene, and dicyclopentadiene are to be mentioned as examples. The olefines can moreover also contain other atom groupings, such as those already mentioned in connection with the alkylene oxides. These compounds include, for example, vinyl chloride, allyl chloride, acrylonitrile, maleic acid esters, cinnamic acid esters, vinyl ethers, vinyl esters, chloroprene, and the epoxides having reactive carbon-to-carbon double bonds already mentioned in connection with the alkylene oxides.

It is, of course, also possible to use the olefines in any desired admixture in carrying out the process of the invention.

The proportions of acetal, alkylene oxide, and olefine can be varied in any desired manner, whereby the properties of the products obtained by the process can be varied within wide limits. In this connection, the reactivity of the separate groups also plays an important part.

By using compounds having several reactive groups, such as, for example, diolefins, dialkylene oxides and/or polyacetals, the reaction can be so conducted that not all reactive groups are converted and a product of higher molecular weight, which still contains reactive alkylene oxide, olefine, and/or acetal groups is obtained. On the other hand, it is also possible in this way to produce cross-linked end products by further reaction. However, the quantity of acetal employed should in all cases be at least 2% of the total charge.

These cross-linked products are obtained more especially when starting from those compounds which also contain at least one reactive carbon-to-carbon double bond in the molecule simultaneously with at least one epoxide group. These can be used by themselves or, alternatively, together with other compounds which only contain one type of functional group.

The reaction of the acetals with the alkylene oxides and olefines takes place in the presence of catalysts such as are known for Friedel-Crafts reactions or catalysts which may be used in ionic-excited polymerization processes. Examples to be mentioned are: boron halides, such as boron trifluoride or boron trichloride, and their adducts, for example, with diethyl ether or tetrahydrofuran; in addition, acid chlorides of the chlorosulphonic and fluorosulphonic acid type, anhydrous metal salts such as ferric chloride, $AlCl_3$, and $SbCl_3$, as well as the catalysts and catalyst systems usual for ionic polymerizations, such as those described in German patent specification Nos. 741,748 and 766,208, and in French patent specification No. 989,269, including ferric chloride mixed with benzyl chloride; antimony pentachloride mixed with hydrobromic acid; aluminum chloride and acetic anhydride; stannic chloride and hydrochloric acid; boron trifluoride and acetic anhydride; zirconium chloride and acetic anhydride; ferric chloride and phosphorous oxychloride; perchloric acid, silicon tetrachloride and hydrochloric acid; arsensic trichloride and acetyl chloride; and the like.

It is believed, but not definitely established, that the acetal forms a carbonium ion in the presence of the catalyst which adds alkylene oxide. The resulting intermediate product retains the acetal function and adds on the olefine. These reactions can be brought about separately by mixing the acetal first with the alkylene oxide or they can be effected simultaneously by mixing the acetal, alkylene oxide, and olefine together at the same time.

The reaction mechanism may be illustrated by the following scheme:

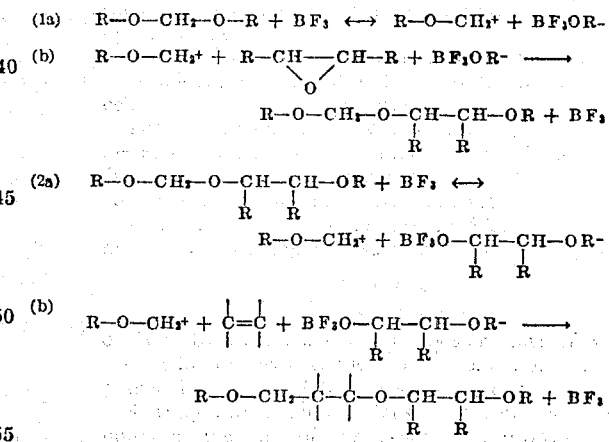

The quantity of catalyst to be used largely depends on the reactivity of the starting components which are selected. Generally speaking, quantities such as 0.001 to 30%, based on the total charge, can be used. However, preferably, at the most, only a catalytic quantity of catalyst or an amount equivalent to the quantity of acetal groups introduced should be used.

In the production of the end-products according to the process of the invention, the individual components can be combined in any desired sequence, taking to account their reactivity. Preferably, the catalyst is first of all mixed with the acetal compound. In many cases, the additional use of solvents, such as, for example, aliphatic or aromatic hydrocarbons, chlorinated hydrocarbons, esters, ethers, ketones, or previously prepared products of the process, is desirable. Moreover, the reaction can take place in the presence of polymerization inhibitors, such as, for example, hydroquinone.

The reaction temperature should generally be in the range of from about 40° C. to about 120° C., and it is advisable in many cases to raise the temperature after adding the components in order to obtain as complete a reaction as possible. After the reaction has been completed, the catalyst is removed in the usual manner and the crude product is freed from unreacted starting material which may still be present, and from any secondary products.

According to one particular form of the process according to the invention, a cyclic monoacetal and an alkylene oxide are first of all reacted in the presence of one of the specified type of catalysts and the reaction product obtained is then further reacted in the presence of the same or another of the said catalysts with a compound having reactive carbon-to-carbon double bonds and, if desired, with more alkylene oxide.

Another modification of the new process consists in that an organic compound with more than one acetal group is first of all reacted with an alkylene oxide in the presence of one of the said catalysts and the resulting product is then further reacted in the presence of the same or another of the said catalysts with a compound having reactive carbon-to-carbon double bonds and, perhaps, with more alkylene oxide.

The intermediate products obtained from the cyclic monoacetals, or the organic compounds containing more than one acetal group, and an alkylene oxide, which products constitute polyacetal ethers, are stable in neutral and alkaline media and can be used as such as plasticizers. The end products of the process constitute organic compounds of high molecular weight, which can be used for many different purposes on account of their diversity.

Since the reaction can be so conducted that very different reactive groups, such as, for example, hydroxyl groups, halogen terminal groups or double bonds, are contained in the final product, they can be subjected to a large number of further reactions. The product of this invention can be used for modifying polyesters and epoxide resins. The product can also be reacted with an organic polyisocyanate to form a polyurethane plastic which can be used to make vehicle tires, sponges, upholstery, insulation, and the like. The product may be used as a plasticizer or emulsifier.

Details concerning the way in which the process of the invention may be carried into effect will be found in the following examples:

Example 1

Under anhydrous conditions, to 100 g. of a triethylene glycol-formaldehyde-polyacetal (OH number: 38.5; $n_D^{20}$: 1.4670; viscosity: 3600 cp./25° C.) are added 10 ml. of boron trifluoridediethylether etherate and then 174 g. of propylene oxide are added dropwise within about 2 hours while stirring and cooling, the temperature not exceeding 35° C. After the mixture has been left to stand overnight at room temperature, it is slowly heated over a period of 3–4 hours to 70° C. and this temperature is maintained for another 4 hours. For neutralization purposes, 20 g. of sodium bicarbonate are added, followed by 50 ml. of water, and the mixture is then stirred for 3 hours at room temperature and the sparingly water-soluble phase is separated after filtration. By distillation up to 120° C./16 mm. Hg, practically only the dissolved water is separated out. 220 g. of the product of the process are left, OH number: 58.0; acid number: 1.0; $n_D^{20}$: 1.4538; viscosity: 400 cp./25° C.

In distilled water, the product provides an emulsion-like solution, and in contrast to polypropylene glycol of higher molecular weights, it is not soluble in light benzene. As compared with the initial polyacetal, the infra-red spectrum shows a strong displacement of the band which must be associated with the acetal grouping.

Example 2

A reaction mixture prepared according to Example 1 is kept for 10 hours at 40° C. after adding the propylene oxide. 70 g. of styrene are then added over a period of 1 hour and the temperature is raised over 10 hours to 80° C. Working up is carried out as in Example 1 and 260 g. of product (as well as 30 g. of unmodified styrene), are obtained, OH number 86.0, $n_D^{20}$: 1.4866.

The product is no longer soluble in water. In the infra-red spectrum, the characteristic band of the product obtained according to Example 1 has disappeared and the additional bands indicate a copolymerization.

Example 3

With the exclusion of moisture, 76 g. of dimethyl formal are carefully mixed with 10 ml. of boron trifluoridediethyl ether etherate. After adding 1 g. of hydroquinone, a mixture of 312 g. of styrene and 174 g. of propylene oxide is added dropwise at 35–40° C. within 4 hours. The temperature is thereafter raised within 3 hours to 80° C. and kept for another 9 hours at 80° C. After cooling, the product is washed with dilute sodium bicarbonate solution and then with water and heated to 130° C./12 mm. Hg. About 180 g. of styrene and 50 g. of propylene oxide are recovered. 267 g. of the product according to the process remain, OH number 72.0; acid number: 0.8; viscosity: 2340 cp./25° C.; $n_D^{20}$: 1.5090; 74.34% C.; 9.60% H; 16.62% O.

The infra-red spectrum indicates a copolymerization of the components.

Example 4

With the exclusion of moisture, to 200 g. of a polyacetal from trioxyethylated trimethylol propane and formaldehyde (OH number: 235; acid number: 1.5; viscosity: 1800 cp./25° C.; 55.61% C; 9.16% H) are added 50 ml. of boron fluoride-diethylether etherate and 1 g. of hydroquinone. A mixture of 381 g. of styrene and 174 g. of propylene oxide is then added dropwise at 35–40° C., and the mixture is then slowly heated to 80° C. and held at this temperature for 9 hours. It is taken up in 500 ml. of dry benzene, washed with aqueous sodium bicarbonate solution, then with distilled water until neutral and then freed from solvents and monomeric fractions up to an internal temperature of 120° C./12 mm. Hg. A light yellow product is obtained in a substantially quantitative yield, OH number: 80.5; acid number: 0.4; viscosity: 7850 cp./25° C.; $n_D^{20}$: 1.5358.

If a mixture of 406 g. of propylene oxide and 797 g. of styrene is added dropwise instead of 381 g. of styrene and 174 g. of propylene oxide, larger quantities of initial material are recovered by the same working-up process and 865 g. of the product of the process are obtained, this showing a clouding effect on standing for a relatively long time, OH number: 72.5; acid number: 0.6.

Example 5

10 g. of boron trifluoride are introduced at room temperature and with the exclusion of moisture into 102 g. of butane-1,4-diol methylene ether. The acetal is changed with the evolution of heat of reaction into a highly viscous product into which, after adding 0.5 g. of hydroquinone, a mixture of 174 g. of propylene oxide and 354 g. of chloroprene is introduced dropwise at 30–40° C. The temperature is maintained for 8 hours at 40° C. and then the mixture is heated for 10 hours to about 55° C., the mixture boiling under reflux. It is neutralized with soda solution and about 250 g. of monomer mixture, mainly chloroprene, are distilled off. A jelly-like mass which is still soluble in organic solvents remain as a residue.

Example 6

A mixture of 208 g. of styrene and 116 g. of propylene oxide is introduced dropwise at 30° C. and with the exclusion of moisture into a mixture of 164 g. of 4-phenyl-1,3-dioxane, 1 g. of hydroquinone and 20 ml. of boron trifluoride-diethyl ether etherate. The temperature is held for 6 hours at 40° C. and the mixture is then heated over 4 hours to 80° C., being held at this temperature for another 10 hours. The reaction product is then added to an aqueous solution of 20 g. of sodium bicarbonate, extracted by shaking and subjected after washing with water to a vacuum treatment up to 180° C. internal temperature. 43 g. of 4-phenyl-1,3-dioxane are recovered, as well as small quantities of styrene. 405 g. of the product of the process are left, OH number: 74.0; viscosity: 49100 cp./25° C.; 79.53% C; 7.90% H; 12.24% O.

Example 7

15 ml. of boron trifluoride-tetrahydrofuran etherate and 0.5 g. of hydroquinone are added with the exclusion of moisture to 150 g. of butane-1,4-dioxethyl glycol/formaldehyde polyacetal (OH number: 49.0; viscosity: 2280 cp./25° C.; $n_D^{20}$: 1.4648; 56.87% C; 9.22% H). From a pressure vessel, a mixture of 135 g. of butadiene and 98 g. of propylene oxide is added dropwise at 30–40° C. The temperature is held for 6 hours at 40° C., then raised over 4 hours to 80° C. and this temperature is then maintained for 10 hours. The cooled product is neutralized with caustic soda solution and water, freed from water-soluble fractions and thereafter freed at an internal temperature up to 135° C./12 mm. Hg from monomeric and low-boiling fractions. 190 g. of the product of the process are left, OH number: 100.5; acid number: 1.2; iodine number: 47.0; viscosity: 354 cp./25° C.; $n_D^{20}$: 1.4691; 62.64% C; 9.85% H; 27.50% O.

Example 8

To 200 g. of the polyacetal described in Example 4 and 400 ml. of absolute benzene are added 1 g. of hydroquinone and 40 ml. of boron trifluoride-diethyl ether etherate. With the exclusion of moisture, a mixture of 381 g. of styrene and 280 g. of epichlorhydrin is then added dropwise. The temperature is held for 10 hours at 40° C., raised over 8 hours to 80° C. and then held for another 4 hours at this level. The reaction mixture is then washed neutral with sodium bicarbonate solution, and with water. By distillation, about 20 g. of styrene are recovered. 810 g. of a brown highly viscous mass are left, OH number: 111.0; acid number: 1.1; $n_D^{20}$: 1.5492; viscosity: 1805 cp./75° C.; 66.87% C; 7.30% H; 13.96% O; 12.00% Cl.

Example 9

15 ml. of boron trifluoride-tetrahydrofuran etherate are added to 200 g. of the polyacetal described in Example 1. After adding 400 ml. of benzene, a mixture of 104 g. of styrene, 116 g. of propylene oxide and 100 g. of a polyglycidyl ether from 1 mol of butane-1,4-diol and 2 mols of epichlorhydrin is added dropwise at 30–40° C. The mixture is heated for another 10 hours at 80° C., and the acid is then neutralized with sodium bicarbonate solution and thereafter distillation is carried out. No styrene is recovered. The residue consists of a highly cross-linked material, the iodine number of which is 0.

Example 10

200 g. of diethylene glycol/formaldehyde/polyacetal (OH number: 51.0; acid number: 2.0; $n_D^{20}$: 1.4652; viscosity: 380 cp./75° C.), 0.3 g. of hydroquinone and 20 ml. of boron trifluoride-tetrahydrofuran etherate are mixed with the exclusion of moisture and at 30–40° C. with a mixture of 232 g. of 3-ethyl-3-hydroxy-methyl-trimethylene oxide and 350 g. of styrene. The mixture is kept for 4 hours at 40° C. and then for 10 hours at 80° C. It is then taken up in 500 ml. of benzene and washed neutral with caustic soda solution and with water. By distillation, 150 g. of styrene are recovered, in addition to the solvent. The product of the process remains as residue and has an —OH number of 126, an acid number of 0.3 and a viscosity of 2070 cp./25° C.

Example 11

200 g. of the polyacetal described in Example 7, with 1 g. of hydroquinone and 20 g. of anhydrous ferric chloride, are mixed at 40° C. with a mixture of 174 g. of propylene oxide and 312 g. of styrene. The temperature is kept for 4 hours at 40° C., raised over 4 hours to 80° C. and then held at this level for 10 hours. The product obtained is treated with dilute hydrochloric acid to split off any acetal bonds which may still be present and to remove the iron salt, and is then washed until neutral and freed by distillation from monomeric fractions. 204 g. of styrene are recovered. 230 g. of the product of the process are left, —OH number: 59.0; acid number: 0.4; viscosity: 2090 cp./25° C.

Example 12

10 g. of boron trifluoride are introduced into 200 g. of the polyacetal described in Example 1 and 230 g. of 1-allyloxy-2,3-epoxypropane are then added at 30–40° C. The mixture is then heated for 15 hours at 80° C. and, after cooling, working up is carried out in a manner analogous to that used in Example 1. By distillation up to 150° C./12 mm. Hg, only minimal quantities of starting material are recovered. The yield of the end product is about 380 g., —OH number: 102.0; acid number: 3.0; viscosity: 9060 cp./25° C.; iodine number: 59.0.

Example 13

10 ml. of boron trifluoride-tetrahydrofuran etherate are first added to 300 g. of the polyacetal described in Example 1 and then 200 g. of ethylene oxide are introduced at 30–40° C., a strong heat effect being produced. 300 g. of styrene are then added dropwise, and the temperature is held for 4 hours at 40° C., raised over 3 hours to 80° C. and then maintained at this level for 10 hours. The substance is taken up in 300 ml. of benzene and washed with sodium bicarbonate solution. By distillation up to 160° C./12 mm. Hg, about 150 g. of styrene are recovered, in addition to the solvent. 600 g. of a light yellow product remain, this product having an —OH number of 58.4 and a viscosity of 3480 cp./25° C.

Example 14

20 ml. of boron trifluoride-diethyl ether etherate and 1 g. of hydroquinone are added to 200 g. of the polyacetal described in Example 1. In an autoclave and with the exclusion of moisture, a mixture of 235 g. of isobutylene and 196 g. of propylene oxide is so added dropwise that the temperature does not exceed 40° C. The mixture is heated for 6 hours at 40° C., raised over a further 6 hours to 80° C. and then held for another 10 hours at this temperature. After cooling, 630 g. of substance are removed, neutralized with sodium bicarbonate solution and the freed at temperatures up to 130° C./12 mm. Hg from secondary products, which amount to about 20%. About 300 g. of product are left, —OR number: 70.0; acid number: 0.6; 65.84% C; 10.80% H; 23.72% O. The product is partially water-soluble; this explains the moderate yield.

Example 15

40 g. of aluminum chloride and 0.3 g. of hydroquinone are added with the exclusion of moisture, to 200 g. of the polyacetal described in Example 1. A mixture of 240 g. of styrene oxide and 300 g. of styrene is then added dropwise at 10° C. The mixture is held for 4 hours at 40° C. and for 20 hours at 60° C. The substance is filtered off from any solid constituents still present, stirred for 3 hours with 20 g. of soda, taken up in 400 ml. of benzene, filtered, and then distilled up to 120° C./12 mm. Hg, about 150 g. of styrene being recovered. About 600 g. of product are obtained, —OH number: 97.0; viscosity: 10550 cp./25° C.

Example 16

20 g. of ferric chloride and then, at 40° C., 220 g. of propylene oxide are added with the exclusion of moisture, to 150 g. of the polyacetal described in Example 7. Thereafter, the mixture is kept in an autoclave for 3 hours at 40° C. and, after slow heating, for 40 hours at 80° C. 20 g. of soda are then added, the mixture is stirred for 4 hours at room temperature, and then filtered with suction. The substance is freed at 120° C./12 mm. Hg from secondary products and 300 g. of the product of the process are obtained, —OH number: 94.0 $n_D^{20}$: 1.4500; viscosity: 579 cp/25° C. The product forms an emulsion with water.

*Example 17*

220 g. of propylene oxide and 150 g. of isobutylene are simultaneously added to the reaction mixture described in Example 16 and this mixture is then further processed in exactly the same way as there described. 350 g. of a product isoluble in water is obtained, —OH number: 120.0; $n_D^{20}$: 1.4605; viscosity: 2995 cp/25° C.

It is to be understood that any of the other catalysts described herein can be substituted for the ones used in the preceding examples. Moreover, any other suitable reactant may be substituted for any one of those specified in the examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claim.

What is claimed is:

A method for making a polymer which comprises reacting an acetal prepared by reaction between triethylene glycol and formaldehyde, propylene oxide and styrene in the presence of a catalytic amount of a boron trifluoride diethyl etherate catalyst.

References Cited by the Examiner

UNITED STATES PATENTS

| | | | |
|---|---|---|---|
| 2,516,960 | 8/1950 | Coffman | 260—2 |
| 2,581,464 | 1/1952 | Zech | 260—47 |
| 2,894,931 | 7/1959 | Sommerville et al. | 260—53 |
| 2,895,945 | 7/1959 | Fischer et al. | 260—42 |

FOREIGN PATENTS 943,011  5/1956  Germany.

OTHER REFERENCES

Durr: J.A.C.S., 76, pages 912–913 (1954).

JOSEPH L. SCHOFER, *Primary Examiner.*

HAROLD N. BURSTEIN, LEON J. BERCOVITZ,
*Examiners.*

JABAS, J. A. SIDLECK, J. T. BROWN,
J. M. DULIN, *Assistant Examiners.*